Feb. 2, 1926. 1,571,467
E. S. COBB
TEMPERATURE REGULATING DEVICE FOR ORCHARDS
Filed June 24, 1924 2 Sheets-Sheet 1
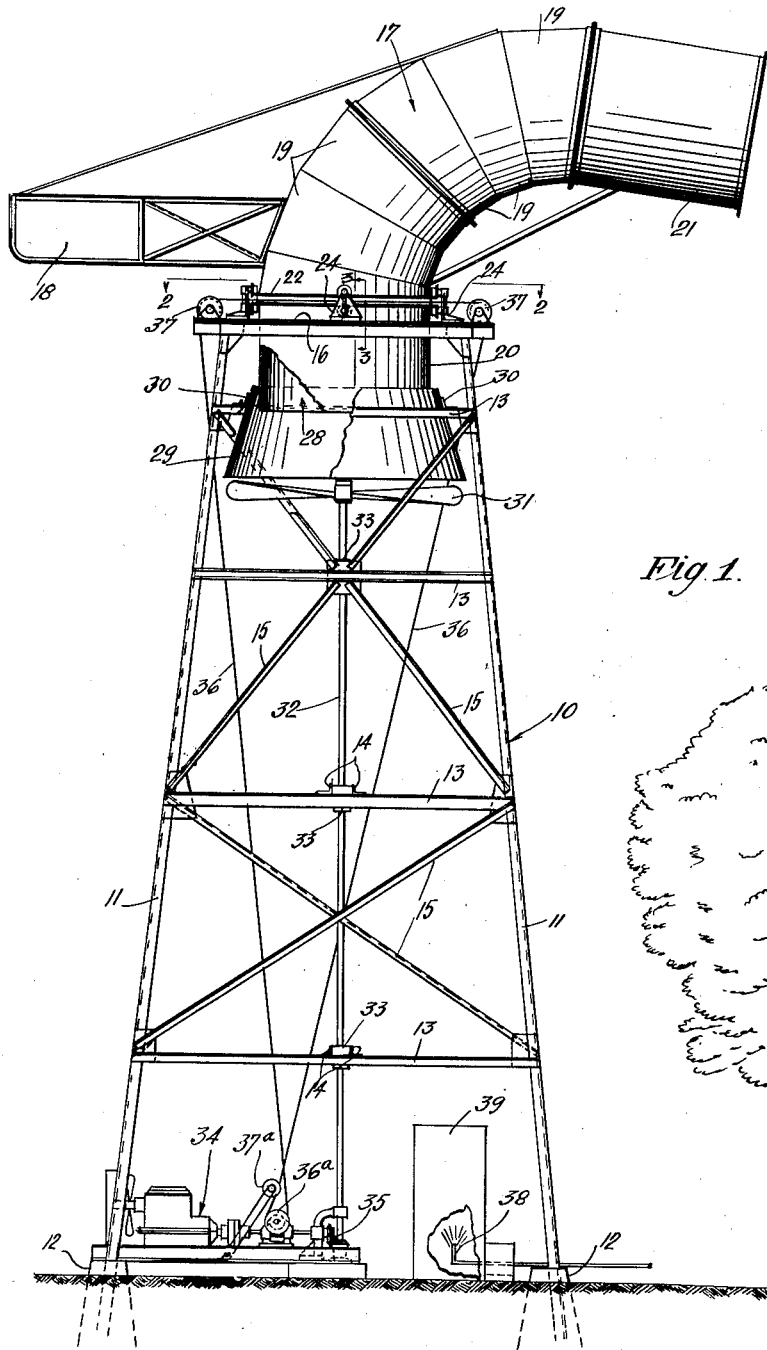
Fig. 1.
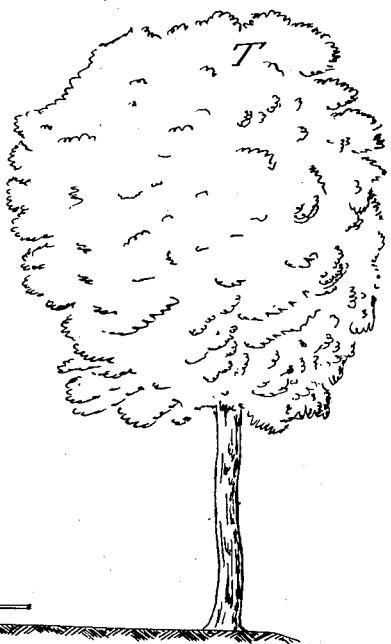
Inventor.
Edward S. Cobb.
Attorney.

Feb. 2, 1926. 1,571,467
E. S. COBB
TEMPERATURE REGULATING DEVICE FOR ORCHARDS
Filed June 24, 1924 2 Sheets-Sheet 2

Inventor.
Edward S. Cobb.

Attorney.

Patented Feb. 2, 1926.

1,571,467

UNITED STATES PATENT OFFICE.

EDWARD S. COBB, OF LOS ANGELES, CALIFORNIA, ASSIGNOR TO COBB TEMPERATURE REGULATOR CO., OF LOS ANGELES, CALIFORNIA, A CORPORATION OF CALIFORNIA.

TEMPERATURE-REGULATING DEVICE FOR ORCHARDS.

Application filed June 24, 1924. Serial No. 722,177.

*To all whom it may concern:*

Be it known that I, EDWARD S. COBB, a citizen of the United States, and a resident of Los Angeles, in the county of Los Angeles, State of California, have invented new and useful Improvements in Temperature-Regulating Devices for Orchards, of which the following is a detailed specification.

This invention relates to devices for circulating air above and down around the trees of orchards or plantings of plantations, to protect them from the damaging effects of excessively high or low temperature.

These devices are adapted to be positioned centrally of an area to be protected, and by reason of the air circulation set up, prevent the deposit of frost on the plantings during cold, calm weather; while, during excessively hot, calm weather the mechanically set-up air movement, which may be either moderate or brisk, protects the plantings from heat injury. Should the temperature fall to such a degree that simple circulation of the air does not suffice to prevent injury from cold, I provide means for heating the air as it passes through the circulating device, and the heated air is distributed over and downwardly into the plant area to be protected.

The many advantages gained by the use of this method of orchard protection over the so-called "smudge pot" method, and the general type of device provided for carrying out the method, are discussed in my United States Letters Patent No. 1,317,959 on Frost preventer for orchards, issued October 7, 1919, and No. 1,357,314 on Process of preventing frost or heat injury in orchards, issued November 2, 1920. Since reference may be had to these patents, it will be unnecessary for me to here discuss their subject matter except to briefly describe the structure of a circulating device there disclosed, in order that I may more definitely point out certain novel features of the present invention.

In the device disclosed in the above-named patents, I employ a vertical stack extending to a point above the plantings to be protected, and on top this stack is mounted a director in the form of a rotatable, tubular elbow, the upper leg of the elbow inclining somewhat downwardly from the horizontal in order that the air blast (forced upwardly through the stack by a blower arranged at or near the ground) may be directed outwardly over and downwardly into the plantings of the protected orchard. By rotating the director, the device progressively directs a current of air over the surrounding area. The application of heat to the circulated air involves the introduction of a burner (or heat delivery pipe from any external heat source) to the interior of the stack at a point above or opposite the blower.

It is among the objects of the present invention to provide a circulating device which may be fabricated and erected at a lower cost and with greater ease than that just described device, and yet have equal or higher efficiency. In carrying out the present invention, I dispense with the vertical stack and merely mount the rotatable director on top a tower, preferably of skeleton construction, so the delivery end of the director is above the plantings to be protected; and the inlet orifice extends in a horizontal plane and is disposed at a considerable height above the ground (assuming, for the purpose of description, that the plantings are in the nature of trees). Then, by mounting a propeller upon a vertical shaft which is approximately coaxial with the inlet orifice and disposing said propeller so it is adapted to rotate in a horizontal plane below the inlet orifice, air may be forced through the director without first confining it.

From a structural standpoint this arrangement is advantageous by reason of the reduced number of parts, the simplicity of construction, ease of the erection, accessibility of working parts, etc.; while it is further advantageous for the reason that it takes in comparatively warm upper air, thus reducing the need for artificial heat to a minimum.

Then again, due to the direct delivery of unconfined air to the director, there is a reduction in energy loss over that occuring in the previous device where horizontally flowing currents of air are taken in at the side and bottom of a stack, the confined current being changed in its direction of flow and passing upwardly through a comparatively long, closed duct before delivery to the director and ultimate discharge to the atmosphere.

Certain other features of novelty and objects of the invention will be set forth in the following detailed description, reference being had to the accompanying drawings wherein:

Fig. 1 is an elevation, partly in broken away section, showing my device in a position relative to a tree of an orchard;

Figure 2:
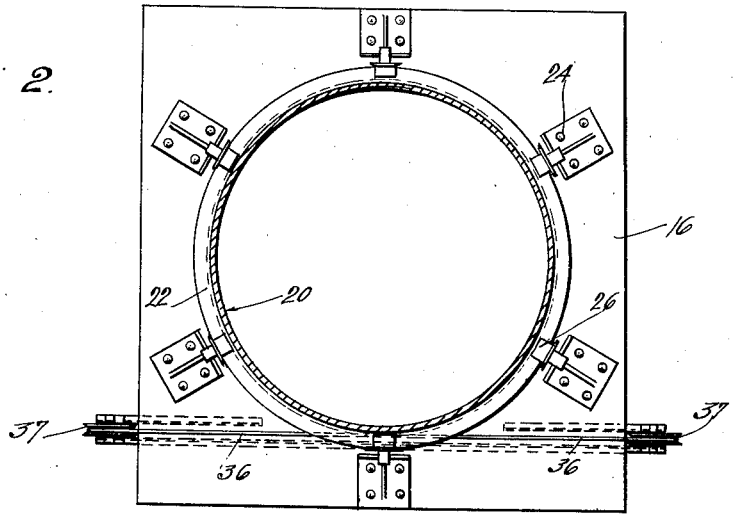
Fig. 2 is a horizontal section on line 2—2 of Fig. 1.
Figure 3:
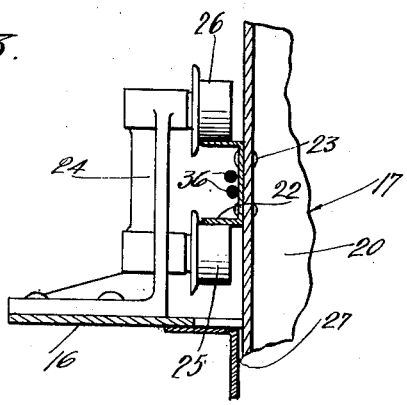
Fig. 3 is an enlarged vertical section on ine 3—3 of Fig. 1.

In the drawings, I show a tower 10, preferably of skeleton construction, including uprights 11 set on footings 12; cross braces 13, 14, diagonal braces 15 and top platform 16. Rotatably mounted on platform 16 is a director generally indicated at 17, this director being in the form of a tubular elbow which is counter-balanced at 18. Elbow 17, preferably built up of a plurality of sections 19, has a vertically disposed leg 20, and approximately horizontally disposed arm 21. The tower is of sufficient height to bring director 17 above trees T of the orchard to be protected, and preferably, arm 21 inclines somewhat downwardly, as illustrated, so air delivered thereby will be directed downwardly as well as outwardly from the tower.

While elbow 17 may be mounted upon tower 10 in any suitable manner enabling the director to be moved to direct currents of air in rotative progression over the area surrounding the tower (though the invention, in its broader aspects, is also applicable to an air circulating device where the director remains stationary) I find the illustrated mounting to be very satisfactory. Channel iron 22 is bent to a circle and is secured to leg 20 at 23. It serves both as a positioning track and as a sheave, as will be later apparent. Brackets 24 are secured on top of platform 16 and each bracket carries the vertically spaced flanged guide rollers 25 and 26. It is apparent from the drawings that the director is mounted for rotation on top the lower rollers 25, and that the roller assembly cooperates with the track to hold the director centered on the tower and in upright position during periods of rotation.

Leg 20 extends downwardly through aperture 27 in platform 16 and terminates a short distance below said platform, the inlet orifice 28 thus being disposed in a horizontal plane at a considerable distance above the ground. Overlapping the ends of leg 20 and concentric therewith is a collar 29 of frusto-conical form which, in effect, forms an outwardly flaring mouth for the inlet end of leg 20. While, in certain instances, I may secure collar 29 to leg 20 or make it integral therewith, I prefer to relieve the director of as much weight as possible by mounting collar 29 entirely independently of the director, for instance, by securing it with angle irons 30 to cross braces 13.

Centrally disposed beneath inlet 28 is a horizontally arranged propeller 31 which is mounted on the vertically disposed shaft 32, the latter being journaled in bearings 33 on cross braces 14. A power plant 34, say an internal combustion engine, is operatively connected through such means as bevel gears 35 to shaft 32, while the engine also supplies power for rotating director 17. The power transmission to the director may be accomplished through cable 36 extending upwardly from engine sheave 36ª, over sheaves 37 on platform 16, and thence coiled about channel 22, which is thus adapted to function as a sheave. Tightener 37ª may be provided for regulating the tension of cable 36.

It is obvious that engine 34 is adapted to revolve propeller 31 for delivering unconfined air from the upper air levels to director 17, and that the director, in its rotation as set up by engine 34, is adapted to direct this air in rotative progression over the area surrounding tower 10, the inclination of arm 21 serving to direct the air downwardly upon trees T.

Positioned beneath and within the spread of propeller 31 is a burner 38, say an oil burner, which may be utilized to supply heated air to director 17 during periods of extreme cold. The burner may be housed within stack 39, and the hot air arising therefrom is carried into the director by propellor 31, the action of the propeller churning the cold and hot air together and insuring an even mixture for delivery from the director outlet.

The air currents in their course at the intake side of the propeller follow the lines of a shallow or large angle cone, and the rising, heated air from the burner comes beneath the spread of this cone and is drawn into the vortex. Hence, there is no necessity for extending stack 39 upwardly any considerable distance toward the director, nor is it necessary that the burner be disposed beneath the center of inlet 28. When leaving the propeller the air is forced upwardly, first in a column of gradually diminishing diameter and then spreading to meet the walls of the director. Propeller 31 may, therefore, be spaced considerably below inlet 28, and yet deliver its full blast to the director without the aid of extension or collar 29. However, this collar is sometimes desirable for insuring the complete delivery of propeller driven air to the director, though much the same effect may be gained by housing in the sides of the tower top to a short distance below platform 16.

It obviously lies within the scope of my invention to provide means other than those shown, for rotating the director and for operating the propellor. For instance, propeller 31 may be cabled driven, or director 17 may be shaft driven. Or shaft 32 might terminate, and the propeller drive be disposed just below the propeller so furnace or burner 38 can be positioned directly beneath the center of inlet 28.

Another variation which lies within the scope of my invention is the provision of a plurality of vertically spaced propellers on shaft 32. Occasion for this variation may arise when it is necessary to increase the current velocity in order to deliver the requisite volume of air through directors of relatively small size and having correspondingly small propellers.

It will be understood that the drawings and description are to be considered merely as illustrative of and not restricted on the broader claims appended hereto.

Having described a preferred form of my invention, I claim:

1. Plantation protecting appartus of the character described, embodying a supporting structure extending to a point above the plantings to be protected, a director mounted at the top of the structure and having its inlet orifice opening to the atmosphere at a point above the base of the supporting structure, and means adjacent the inlet orifice and adapted to deliver unconfined air to the director and then force it through and out the director, said director being adapted to direct such air outwardly above the plantings to be protected.

2. Plantation protecting apparatus of the character described, embodying a supporting structure extending to a point above the plantings to be protected, a director mounted at the top of the structure and having its inlet orifice opening to the atmosphere at a point above the base of the supporting structure, and means adjacent the inlet orifice and adapted to deliver unconfined air to the director and then force it through and out the director, said director being adapted to direct such air outwardly above and downwardly onto the plantings to be protected.

3. Plantation protecting apparatus of the character described, embodying a supporting structure extending to a point above the plantings to be protected, a director mounted at the top of the structure and having its inlet orifice opening to the atmosphere at a point above the base of the supporting structure, and means adjacent the inlet orifice and adapted to deliver unconfined air to the director and then force it through and out the director, and means to heat the air prior to its delivery from the director; said director being adapted to direct such air outwardly above and downwardly onto the plantings to be protected.

4. Plantation protecting apparatus of the character described, embodying a supporting structure extending to a point above the plantings to be protected, a director mounted at the top of the structure and having its inlet orifice horizontally disposed and opening to the atmosphere near the top of the supporting structure, and a horizontally disposed, power driven propeller supported below said inlet and adapted to force air upwardly thereinto.

5. Plantation protecting apparatus of the character described, embodying a skeleton tower extending to a point above the plantings to be protected, a director mounted at the top of the tower and having its inlet orifice horizontally disposed and openings to the atmosphere near the top of the tower, and a horizontally disposed, power driven propeller supported below said inlet and adapted to force air upwardly thereinto.

6. Plantation protecting apparatus of the character described, embodying a supporting structure extending to a point above the plantings to be protected, a director mounted at the top of the structure and having its inlet orifice horizontally disposed and opening to the atmosphere near the top of the supporting structure, a horizontally disposed power driven propeller supported below said inlet and adapted to force air upwardly thereinto, and air heating means disposed beneath the propeller.

7. Plantation protecting apparatus of the character described, embodying a supporting structure extending to a point above the plantings to be protected, a rotatable director mounted at the top of the structure and having its inlet orifice horizontally disposed and opening to the atmosphere near the top of the supporting structure, a horizontally disposed, power driven propeller supported below said inlet and adapted to force air upwardly thereinto, and means for rotating the director.

8. Plantation protecting apparatus of the character described, embodying a supporting structure extending to a point above the plantings to be protected, a director mounted at the top of the structure and having its inlet orifice horizontally disposed and opening to the atmosphere near the top of the supporting structure, a horizontally disposed power driven propeller supported below and in vertically spaced relation with respect to said inlet, and an outwardly flaring collar intermediate and opening at its opposite ends to said director and said propeller.

9. Plantation protecting device of the character described, embodying a tower, a director that is characterized as an open ended elbow with its intake end extending substantially vertically and terminating near the top of the tower whereby its inlet orifice opens to the atmosphere at a point considerably above the base of the tower, and director supporting means associated with the tower for rendering the elbow capable of rotation about the axis of said vertical leg.

10. Plantation protecting apparatus of the character described, embodying a skeleton tower extending to a point above the plantings to be protected, a director mounted at the top of the tower and having its inlet orifice horizontally disposed and opening to the atmosphere near the top of the tower, a horizontally disposed, power driven propeller supported below said inlet and adapted to force air upwardly thereinto, and an air heater delivering heated air into unconfined spacer below the propeller.

In witness that I claim the foregoing I have hereunto subscribed my name this 17th day of May 1924.

EDWARD S. COBB.